J. WACHTELSCHNEIDER.
FOOD CONTAINER AND HEATER.
APPLICATION FILED MAR. 14, 1914.
1,130,222.
Patented Mar. 2, 1915.
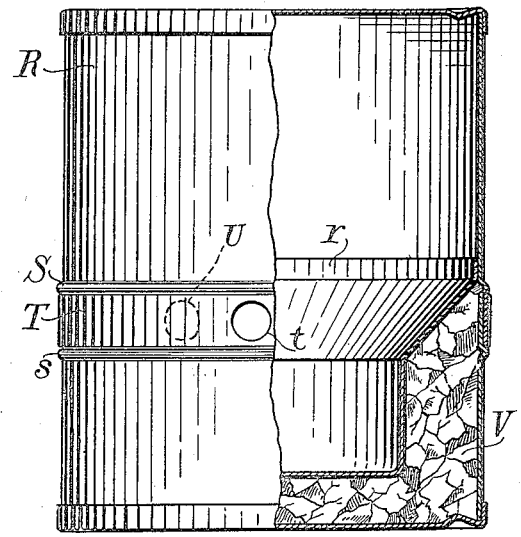
Witnesses
G. Terry
R. C. Balinger.
Inventor
By Joseph Wachtelschneider,
Edwin Guthrie,
Attorney

UNITED STATES PATENT OFFICE.

JOSEPH WACHTELSCHNEIDER, OF NEW YORK, N. Y.

FOOD CONTAINER AND HEATER.

1,130,222.

Specification of Letters Patent.    Patented Mar. 2, 1915.

Application filed March 14, 1914. Serial No. 824,741.

*To all whom it may concern:*

Be it known that I, JOSEPH WACHTELSCHNEIDER, a citizen of the United States, residing at New York, in the county of New York, and State of New York, have invented certain new and useful Improvements in Food Containers and Heaters, of which the following is a specification.

This invention relates to food containers and heaters, and belongs to that class of receptacles which include a compartment containing a charge of unslaked lime to which water may be admitted when it is desired a warm the food for consumption.

The object of this invention is to provide a food receptacle of the class stated wherein a normally closed compartment filled with unslaked lime has one of its walls provided with means for admitting water into the lime, and the water-admitting means are opened by the movement of an external portion of the receptacle or device borne thereby.

It is further an object of this invention to provide the said water-admitting means with a frangible portion capable of being ruptured by a force applied sufficient for the purpose, as by a blow, which will rupture the frangible portion of the water-admitting means and allow the water to enter the lime compartment.

The drawing is a vertical section and shows means for admitting water to the lime controlled by a movement of an external part of the receptacle.

Throughout the drawing and description, the same letter is used to refer to the same part.

In the invention set out in the drawing there is a receptacle R having a funnel-shaped internal member r, together forming the food-receiving compartment. On the outside of the receptacle R are formed encircling ribs S and s and a movable band T is constructed between them in such manner that it may be turned around the axis of the receptacle by hand, and the opening t in the band T brought to register with the opening U in the wall of the receptacle whereby water from without may be admitted to the lime V in the lower compartment illustrated. It is desired that while the movably mounted band T may be readily turned by hand, it will frictionally resist circular displacement sufficiently to avoid the accidental exposure of the opening U. To prevent the undesired slaking of the lime during such time as this invention containing food stuff may be stored, it will be understood that the opening U may be closed or sealed with any material or in any known way that will permit it to be cleared when desired. When so closed, the opening U constitutes a weakened portion of the wall of the lime chamber, and the band protects it.

In explaining the mode of operation of this invention, it may be first stated that the receptacle is constructed and the proportion of lime introduced with due regard to the pressure created internally as the unslaked lime takes up the water. It is not, of course, desired that the pressure should be excessive in any instance.

Almost any implement ordinarily at hand, such as a pocket knife or key, will effectively clear the opening U, and water in sufficient quantity may be introduced.

Having now described this invention, and explained the mode of its operation, what I claim is:—

1. A food container and heater, comprising a food-receiving compartment, a compartment provided with a charge of unslaked lime and having a wall constructed with a weakened portion, and a member movably mounted and normally arranged to cover the weakened portion of the said wall and movable to uncover the said weakened portion.

2. A food container and heater, comprising a food-receiving compartment, a compartment provided with a charge of unslaked lime and having a wall constructed with a weakened portion, a movably mounted band normally arranged to cover the weakened portion of the said wall and movable to uncover the said weakened portion, and means for retaining and guiding the band.

In testimony whereof I affix my signature in presence of two witnesses.

JOSEPH WACHTELSCHNEIDER.

Witnesses:
  FRANK DEVECIS,
  HENRY SCHWARTZ.